United States Patent [19]

Vogt

[11] 3,832,497

[45] Aug. 27, 1974

[54] TELEPHONE ATTACHMENT FOR LIMITING DIALING

[76] Inventor: Kuno J. Vogt, 5854 Kanton Ct., San Diego, Calif. 92122

[22] Filed: Nov. 20, 1972

[21] Appl. No.: 307,816

[52] U.S. Cl. ................................ 179/90 D, 179/161
[51] Int. Cl. ............................................ H04m 1/66
[58] Field of Search......... 179/18 DA, 90 D, 189 D, 179/161

[56] References Cited

UNITED STATES PATENTS

| | | | |
|---|---|---|---|
| 3,358,087 | 12/1967 | Von Stein | 179/90 D |
| 3,727,009 | 4/1973 | Ireland | 179/90 D |
| 3,748,402 | 7/1973 | Yussen | 179/90 D |

*Primary Examiner*—Kathleen H. Claffy
*Assistant Examiner*—Mitchell Saffian
*Attorney, Agent, or Firm*—Richard K. Macneill

[57] ABSTRACT

A telephone long distance attachment for attaching to a standard telephone on the outside housing thereof, without in any way dismantling the telephone, for preventing long distance calls and at the same time facilitating local calls in which a first ratchet mechanism limits the number of dialed digits to those required for a local call only, a second ratchet mechanism prevents dialing the operator on the first dial, a third ratchet mechanism prevents the release of the telephone buttons before they are fully pressed to prevent dialing by depressing the buttons.

4 Claims, 10 Drawing Figures

TELEPHONE ATTACHMENT FOR LIMITING DIALING

BRIEF DESCRIPTION OF THE INVENTION

The present invention relates to a telephone long distance attachment, and more particularly to a telephone long distance attachment for preventing long distance calls, while allowing local calls.

According to the invention a telephone long distance attachment is provided for easily slipping over a standard telephone in a locked position. One ratchet mechanism is coupled to the dial, which limits the number of digits that can be dialed — i.e., in the majority of areas, with a standard telephone it is necessary to dial more than seven digits to place a directly dialed long distance call. In some locations, for example an in-plant telephone, it is necessary to dial more than eight digits, as in the case when the digit 9 must be dialed to get an outside line. In this case the limitation would be for eight digits instead of seven. Hence a directly dialed long distance call out of that area code would be prevented. Two other features are the prevention of dialing the digit 0 on the first call, so that the operator cannot be reached for the placement of a long distance call. A further ratchet mechanism prevents a partial depression of the telephone buttons and their return for dialing, by clicking the buttons at their crucial contact making and breaking points for dialing the area code in that manner prior to the normal number of digits. A delay mechanism built into the return of the telephone buttons prevents a rapid clicking of the buttons by full depression for dialing the digit one. A further feature lies in a disabling mechanism for disabling the entire mechanism and allowing long distance calling and dialing. This, of course, could be actuated through a lock and key.

An object of the present invention is the provision of a telephone attachment for the prevention of long distance calls while allowing local calls.

Another object of the invention if the provision of a telephone attachment for the prevention of raised sectors referred to as dialing the operator, or "0" on the first dial.

A further object of the invention is the provision of a telephone attachment for the prevention of long distance calls while allowing local calls, which limits the number of digits that can be dialed at any one time, in any one sequence.

Yet another object of the invention is the provision of a telephone attachment for the prevention of long distance calls while allowing local calls, which prevents the telephone buttons from being depressed part way and then returned.

A still further object of the invention is the provision of a telephone attachment for preventing long distance calls, while allowing local calls, which is easily installed in a standard telephone and locked without altering the telephone itself.

Other objects — wherein.

Figure 5:
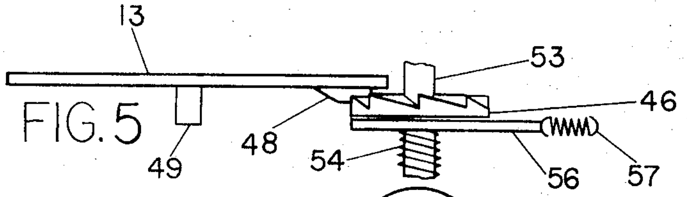
FIGS. 5 and 6 are schematic representations of the operator dialing prevention mechanism in standard local use.
Figure 6:
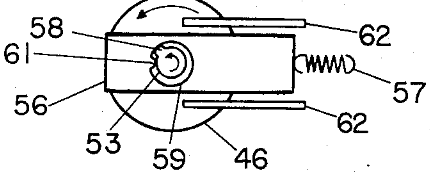
Figure 7:
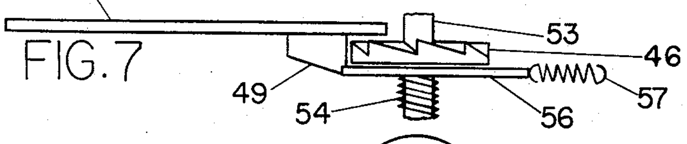
Figure 8:
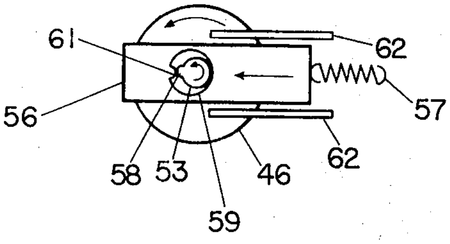
Figure 9:
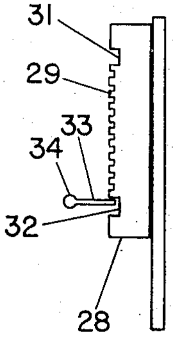
Figure 10:
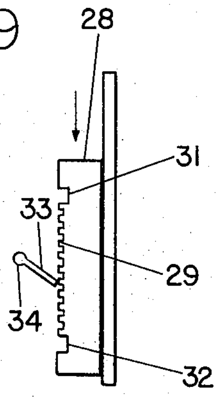

FIGS. 7 and 8 are schematic representations of the mechanism of FIGS. 5 and 6 when an attempt is made to dial the operator; and FIGS. 9 and 10 are schematic representations of a prevent mechanism for the prevention of the return of the telephone buttons after partial depression.

DETAILED DESCRIPTION OF THE DRAWINGS

Figure 1:
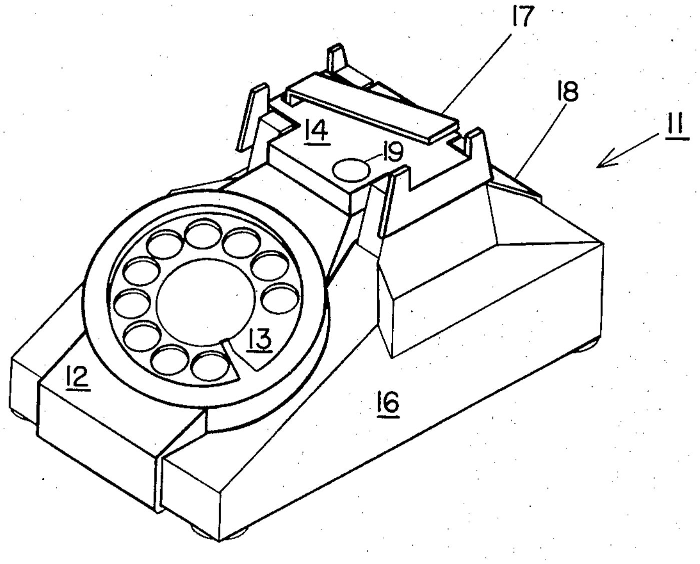
FIG. 1 is a perspective view illustrating the preferred embodiment of the present invention in situ.

Referring to FIG. 1, a telephone with the attachment for limiting area calls is shown generally at 11. The telephone attachment has a dial portion 12 with a dial 13 which is held in place with a lever portion 14, and the underside of telephone housing 16. Lever portion 14 receives a lever 17, and is mounted over the button portion of the telephone (not shown). A back portion 18 is also held captive by telephone housing 16 and lever portion 14. An aperture is shown at 19 to accommodate a locking mechanism (not shown).

Figure 2:
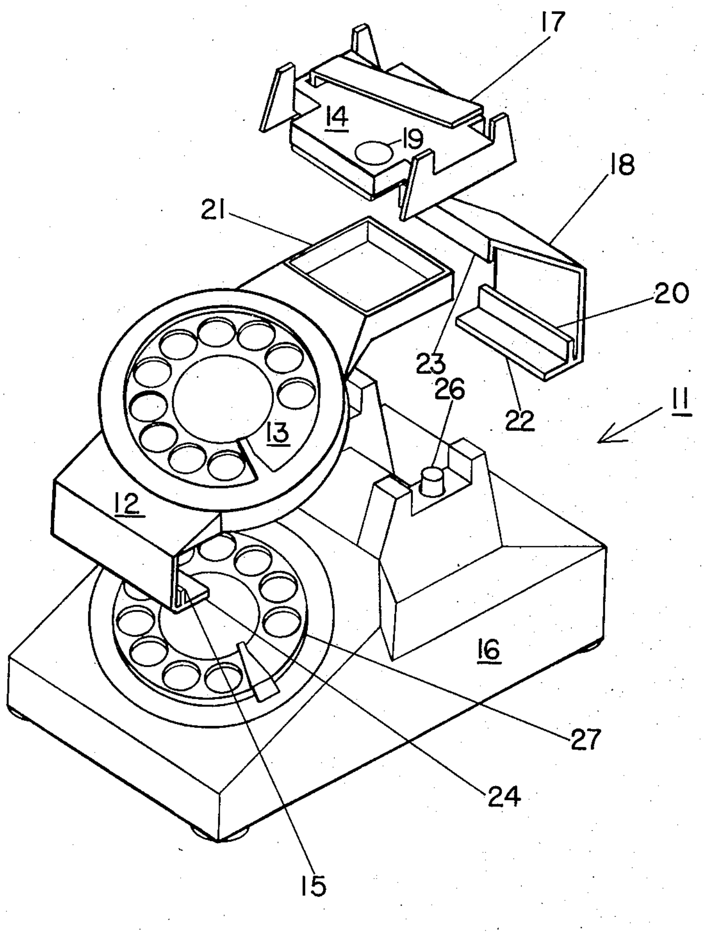
FIG. 2 is a perspective view illustrating the main components of the present invention in an exploded relationship with a standard telephone.

Referring to FIG. 2, the entire apparatus is again shown at 11, with a dial portion 12 of the attachment carrying dial 13 of the attachment which terminates in a square frame portion 21. Lever portion 14 carries lever 17. Back portion 18 has a locking lip 20 extending from ledge 22, together with another locking lip 23. Dial portion 12 has a locking lip 15 extending from ledge 24. Telephone housing 16 is shown with telephone button 26 emerging therefrom. Telephone dial 27 is substantially identical with dial 13 of dial portion 12 of the telephone attachment.

Figures 3, 4:
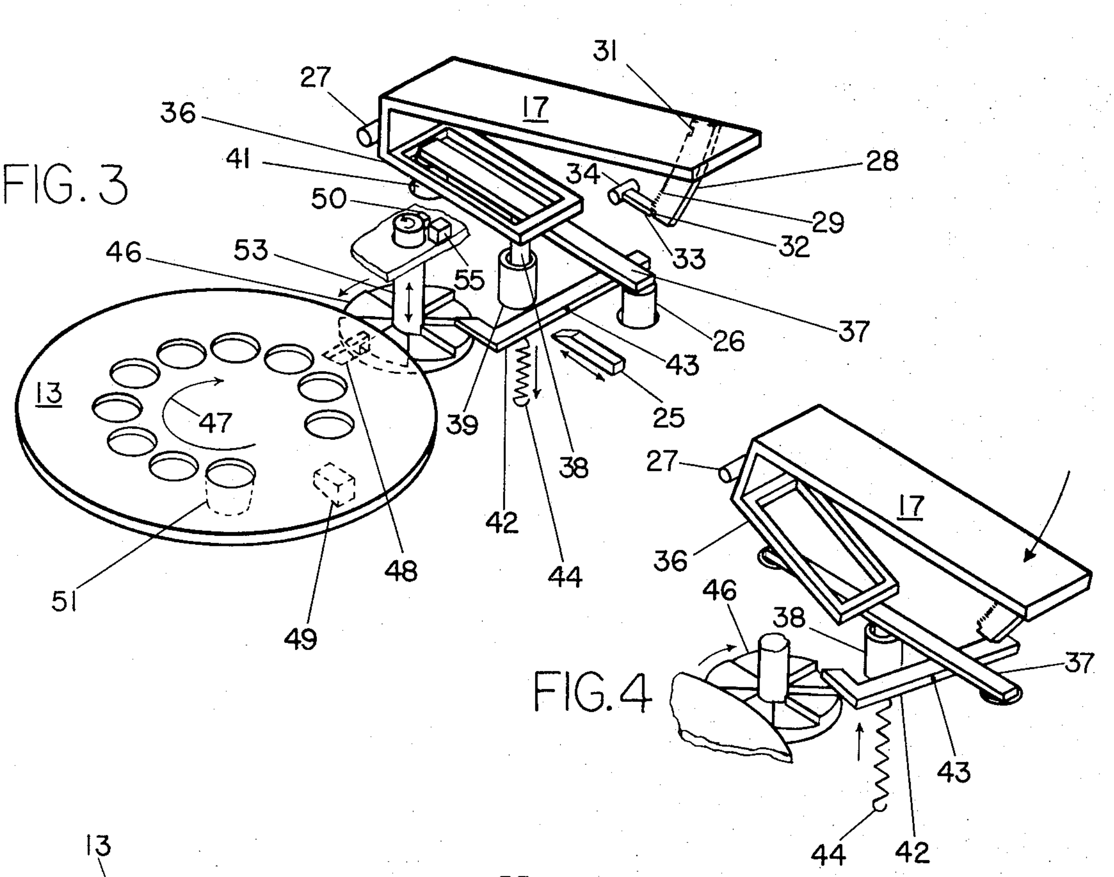
FIG. 3 is a schematic view in perspective of the operating mechanism of the preferred embodiment of the present invention.
FIG. 4 is a schematic representation in perspective of the operating mechanism of FIG. 3 after 1 digit has been dialed.

Referring to FIG. 3, a part of the mechanism carried by and disposed within housing portions 12, 14, and 18 of FIGS. 1 and 2 are shown schematically in perspective. Lever 17 is pivotally carried at 27, and carries a ratchet bar 28 having ratchet teeth 29 with terminating notches 31 and 32. Ratchet arm 33 is in communication with terminating notch 32, and is pivotally mounted at 34. Lever arm 17 terminates in contact bar 36 which contacts button arm 37, which in turn is carried by shaft 38. Shaft 38 is carried by delay mechanism 39. Button arm 37 is in contact with buttons 26 and 41.

Counter arm 42 is pivotally mounted at 43 and is fixedly attached to button arm 37. Contact arm 42 is spring biased downward by biasing spring 44. Counter arm 42 is held in slidable contact with counting wheel 46, having a plurality of pie-shaped ratchet sections thereon. Dial 13 is rotatably mounted, as indicated by circular arrow 47, and carries an activating extension 48 on its lower surface. Operator stop 49 and dial coupler extension 51 are carried on a lower surface of dial 13. Disabling bar 52 is mounted in operable proximity to counter arm 42 for moving counter arm 42 out of slidable contact with counting wheel 46.

Referring to FIG. 4, counter arm 42 is shown being forced upward and out of contact with counter wheel 46 due to the pivotal action at 43 when lever arm 17 is depressed because of the telephone receiver's placement thereon.

Referring to FIGS. 5 and 6, dial 13 of dial portion 12 (not shown) is shown in operable proximity to counting wheel 46 with counter stop 48 extending downwardly from dial 13. Counter wheel 46 is carried by a shaft 53 which is spring biased at 54 for both rotation and axial movement. Operator stop arm 56 is spring biased in the direction indicated by a spring 57. Shaft 53 carries a cam extension 58 which rides on the side of surface aperture 59 in operator stop arm 56. Aperture 59 has an extension 61. Operator stop arm 56 is slidably carried by guides 62.

Referring to FIGS. 7 and 8, dial 13 is shown in proximity with counter wheel 46 which, again, is carried by shaft 53 and spring biased at 54 against rotation and axial movement. In this view, extension 58 of shaft 53 is in alignment with extension 61 of aperture 59, forcing operator stop arm 56 to the left as indicated by the arrow.

Referring to FIG. 9, ratchet arm 28 is linearally illustrated, having ratchet teeth 29 with stop notches 31 and 32. Ratchet arm 33 is shown at stop notch 32 and is pivotally mounted at 34.

Referring to FIG. 10, ratchet arm 28 has been depressed as indicated by the arrow and ratchet arm 33 now rests in the teeth portion 29 of ratchet arm 28, and has been pivoted at 34 in a downward direction.

OPERATION

Referring back to FIG. 3 and FIG. 4, it can be seen that when lever 17 is depressed, as by placing the receiver on the phone and on lever 17, contact bar 36 depresses button arm 37 which, in turn, depresses telephone buttons 26 and 41. In the position shown in FIG. 3, a telephone receiver has been lifted off lever 17 and delay mechanism 39 has allowed contact button arm 37 to rise along with telephone buttons 26, 41 and the mechanism is in condition for dialing. As each digit is dialed, actuating extension 48 contacts a pie-shaped ratchet section of counting wheel 46, rotating it in the direction of the arrow, and with it shaft 53. As each segment is rotated counter arm 42 counts one pie-shaped ratchet section and holds it until counter stop 50 contacts stop 55, at which time further digits cannot be dialed until the receiver is replaced on lever 17, which depresses button arm 37 and rotates counter arm 42 at pivot point 43 off counting wheel 46 (Counting Wheel 46 being biased to return stop 50 in the position shown). Obviously, while counter wheel 46 is shown with 7 segments, it could have any desired number of segments as dictated by the number of digits required to make a local call.

Referring to FIGS. 3, 5, and 6, the dial operator stop will be discussed. If the number zero or operator is attempted to be dialed on the first digit shaft 53 will be in the position shown in FIG. 6, as well as operator stop arm 56. As dial 13 is rotated toward the phone stop (not shown) cam extension 58 of shaft 53 will come in contact with extension 61 of aperture 59 of operator stop arm 56, and the operator stop arm 56 will be forced to the left as shown in FIGS. 7 and 8. At the same time operator stop 49 will be in the position shown in FIG. 7, abutting stop arm 56 and preventing the completion of the 0 dial. At any other time in the dialing sequence shaft 53 will be in a different position as dictated by accounting wheel 46 and operator stop arm 56 will not be in its actuated position for abutting with operator stop 49.

Referring to FIG. 9, it can be seen that lever 17 is in the receiver off position and ratchet arm 33 is in stop notch 32. When the receiver is replaced on lever 17, ratchet arm 28 is depressed as shown in FIG. 10, and ratchet arm 33 pivots at point 34, riding up ratchet teeth 29 until the top stop notch 31 is reached. At this point it can pivot within the notch 31 and return to stop notch 32 when the receiver is again removed. If a reversal of direction is attempted between the two stop notches 31 and 32, the pivot arm 33 ratchet arm 33 will not pivot due to ratchet teeth 29, as shown clearly in FIG. 10. This feature in conjunction with delay mechanism 31 makes it impossible to dial by clicking buttons 26 and 41.

If it is desired to disable counter wheel 46 and counter arm 42, disabling arm 25 is moved into counter arm 42, raising it against bias spring 44 away from counting wheel 46. Bias spring 54 will then return shaft 53 to its starting position as shown in FIG. 3 after each digit is dialed. Spring 54, also bias rod 53, moves upward so that counting wheel 46 makes a more positive contact with counter arm 42.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A telephone long distance attachment for attaching to a standard telephone on the outside housing thereof and for preventing long distance calls while facilitating local calls comprising:

a telephone attachment dial rotatably coupled to said attachment coupled to and in vertical alignment with the dial on the telephone to which the attachment is attached;

a ratchet mechanism coupled to said telephone attachment dial for movement thereof, said ratchet means comprising a ratchet wheel having a plurality of pie shaped sections thereon;

a counting means coupled to said ratchet means for counting the number of digits dialed, said counting means comprising a counting arm slidably coupled to said ratchet wheel for counting said pie shaped sections, the coupling means between said telephone attachment dial and said ratchet means operable for advancing said ratchet wheel one pie shaped section with each dialed digit;

a stop means coupled to said ratchet means for stopping further dialing after a predetermined number of digits have been dialed; and a delay mechanism coupled to the buttons on the telephone to which the attachment is attached for delaying the return movement of the buttons after the buttons have been depressed.

2. A telephone long distance attachment for attaching to a standard telephone on the outside housing thereof and for preventing long distance calls while facilitating local calls comprising:

a telephone attachment dial rotatably coupled to said attachment coupled to and in vertical alignment with the dial on the telephone to which the attachment is attached;

a ratchet mechanism coupled to said telephone attachment dial for movement thereof;

a counting means coupled to said ratchet means for counting the number of digits dialed;

a stop means coupled to said ratchet means for stopping further dialing after a predetermined number of digits have been dialed; and a delay mechanism coupled to the buttons on the telephone to which the attachment is attached for delaying the return movement of the buttons after the buttons have been depressed.

3. A telephone long distance attachment for attaching to a standard telephone on the outside housing thereof and for preventing long distance calls while facilitating local calls comprising:

a telephone attachment dial rotatably coupled to said attachment coupled to and in vertical alignment with the dial on the telephone to which the attachment is attached;

a ratchet mechanism coupled to said telephone attachment dial for movement thereof;

a counting means coupled to said ratchet means for counting the number of digits dialed;

a stop means coupled to said ratchet means for stopping further dialing after a predetermined number of digits have been dialed;

and a ratchet means coupled to the buttons on the telephone to which the attachment is attached operable for preventing partial depression of the telephone buttons and their return.

4. A telephone long distance attachment for attaching to a standard telephone on the outside housing thereof and for preventing long distance calls while facilitating local calls comprising;

a telephone attachment dial rotatably coupled to said attachment coupled to and in vertical alignment with the dial on the telephone to which the attachment is attached;

a ratchet mechanism coupled to said telephone attachment dial for movement thereof;

a counting means coupled to said ratchet means for counting the number of digits dialed;

stop means coupled to said ratchet means for stopping further dialing after a predetermined number of digits have been dialed;

and a camming means coupled to said telephone attachment dial and operable for preventing the number 0 for operator to be dialed as the first digit.

* * * * *